United States Patent [19]

Jacyno et al.

[11] 4,118,865

[45] Oct. 10, 1978

[54] ASSEMBLY FOR REMOVABLY ATTACHING FLEXIBLE CUTTING LINE ELEMENT IN GRASS TRIMMER

[75] Inventors: Anthony Jacyno, Columbia, Mo.; Richard T. Smith, St. Charles, Ill.

[73] Assignee: McGraw-Edison Company, Elgin, Ill.

[21] Appl. No.: 759,424

[22] Filed: Jan. 14, 1977

[51] Int. Cl.² .................. B26B 27/00; A01G 3/06
[52] U.S. Cl. ............................. 30/276; 56/12.7
[58] Field of Search ............ 30/276, 347; 56/12.7, 56/295, 29, 377; 15/179, 186, 194, 202

[56] References Cited

U.S. PATENT DOCUMENTS

| 2,382,292 | 8/1945  | Carlson ...................... 339/276 T |
| 3,104,510 | 9/1963  | Voigt ............................ 30/347 X |
| 3,402,542 | 9/1968  | Johnston ........................... 56/295 |
| 3,474,608 | 10/1969 | Frick .............................. 56/295 |
| 3,831,278 | 8/1974  | Voglesonger ..................... 30/276 |
| 3,877,146 | 4/1975  | Pittinger ......................... 30/276 |

FOREIGN PATENT DOCUMENTS 556,632  12/1974  Switzerland .................. 30/276

Primary Examiner—Jimmy C. Peters
Attorney, Agent, or Firm—Ronald J. LaPorte; Jon Carl Gealow

[57] ABSTRACT

A grass trimmer employing a short length of nylon or the like line as the cutting element includes an assembly for removably attaching the line to a rotatable drive member. A hub member is coupled to the drive member for rotation. A post member extends from the free end of and parallel to the axis of rotation of the hub member. A rim portion also formed on the hub member, extends along a portion of the periphery thereof and defines a radially extending aperture therethrough. A length of line to be attached for rotation includes an eyelet connector at one end thereof. The opposite end of the line is received in the aperture in the rim portion so that the line extends radially outwardly from the hub member. The eyelet aperture receives the post member for removably attaching that end of the line to the hub member. A preferred embodiment of the cutting line has a triangular cross section to provide cutting edges extending the length of the line.

28 Claims, 8 Drawing Figures

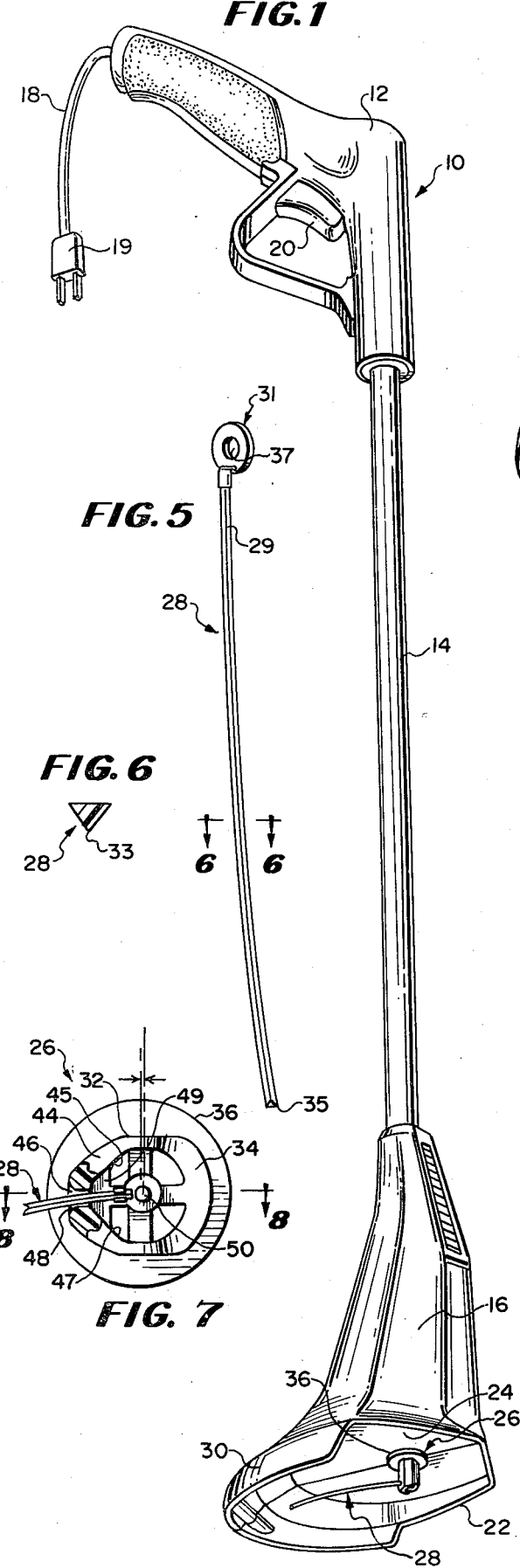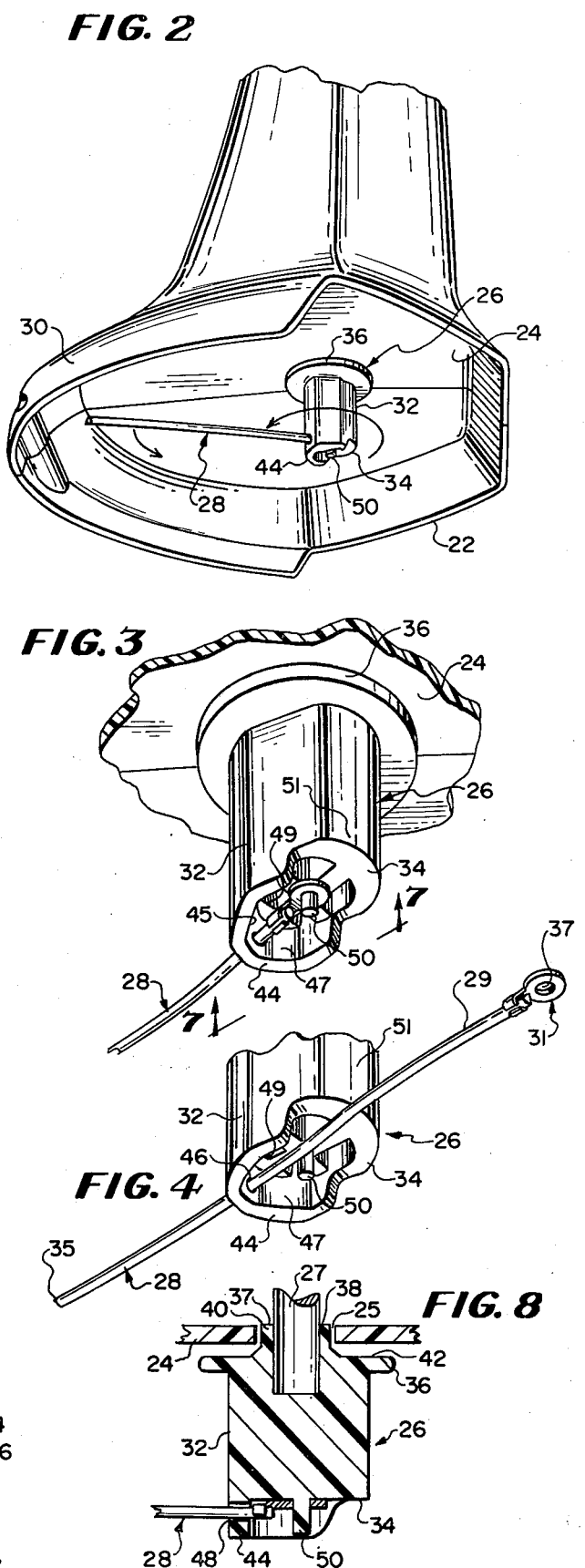

ASSEMBLY FOR REMOVABLY ATTACHING FLEXIBLE CUTTING LINE ELEMENT IN GRASS TRIMMER

BACKGROUND OF THE INVENTION

This invention relates generally to a grass edger or trimmer which employs a short length of plastic or the like cord as the grass cutting element and more particularly to an assembly for removably attaching the cord to a rotatably driven member of the trimmer.

Many different arrangements for attaching a length of cord to a rotatable member in a grass trimmer or edger are shown in the prior art. For example, in one embodiment shown in U.S. Pat. No. 3,708,967, issued Jan. 9, 1973, lengths of cutting line are looped through apertures spaced about the periphery of and tied to a rotatable disk. In an alternative embodiment of the device, radially extending apertures communicating with the peripheral apertures are also provided in the disk. Lengths of line, each having a knotted end, are received in the last mentioned apertures. The knots secure the lines to the disk with the aid of the centrifugal force produced during rotation thereof.

Still another arrangement for attaching short lengths of line to a rotating member in a grass trimmer is shown in U.S. Pat. No. 3,831,278, issued Aug. 27, 1974, wherein a diametrically extending channel is defined in the member. An axial recess communicating with the channel is also formed in the member. A knot or enlarged hub portion at the center of a length of cutting line is received in the recess with the opposite ends of the line extending radially outwardly through opposite ends of the channel. In this case, the central knot secures the line to the member against the centrifugal force created upon rotation of the member.

While the prior art arrangements described heretofore function satisfactorily for the most part to secure a length of cutting line to the rotating member of a grass edger or trimmer, they have certain disadvantages which make them undesirable. For instance, in the case of the first described embodiment of the U.S. Pat. No. 3,708,967 patent, tying the end of the cutting line to the rotating disk member can be time consuming as a typical nylon or plastic cutting element while being relatively flexible is sufficiently stiff to make it difficult to tie. The use of a knotted end on the cutting line to retain the line in position with respect to the rotating member provides no positive means for securing the line during non-use of the trimmer as it requires the centrifugal force generated by the rotating member to retain the line on the member.

In the case of the U.S. Pat. No. 3,831,278 device, it appears that mounting the cutting line properly on the rotating member could also be difficult and time consuming.

In addition to the above, it should be noted that in the prior art arrangements discussed, the cutting lines illustrated have had circular cross sections. The cutting surfaces therefore appear to be somewhat blunt and could thus be less effective against thick or high grass.

SUMMARY OF THE INVENTION

Accordingly, it is a primary object of the present invention to provide a new and improved assembly for removably attaching a cutting element comprising a relatively short length of cord or like, to a rotatably driven member of a grass edger or trimmer which overcomes the drawbacks of the prior arrangements discussed heretofore.

It is another object of the present invention to provide an assembly of the above-described type which is relatively simple in construction, yet effective in operation.

It is still another object of the present invention to provide a cutting line for a grass edger or trimmer of the above-described type that does not suffer the drawbacks of prior art cutting lines described heretofore.

Briefly, a preferred embodiment of the cutting line attachment assembly for a grass edger or trimmer according to the invention comprises a hub member which is driven rotatably by the drive shaft of the trimmer motor. The hub member includes a post extending outwardly from the free end, parallel to the axis of rotation thereof, but slightly off center with respect thereto. An outer rim portion is also formed on the periphery of the free end of the hub member. The rim portion is located on the side of the axis of rotation of the hub member opposite that of the post and partially surrounds the post. An aperture is defined in the rim portion which extends radially with respect to the hub member.

A length of cutting line to be attached to the hub member includes an eyelet connector affixed at one end of the line. The opposite end of the line is received in the aperture in the rim portion and extends radially outwardly therefrom. The post is received in the eyelet aperture for securing the first mentioned end of the line to the hub member. The off center post provides ease of attachment and removal of the eyelet connector thereto. The hub member may also be thickened on the opposite side from the line to provide a counterbalancing weight which minimizes any vibration due to the unbalanced weight of the line.

The exterior wall of the rim portion is tapered about the aperture to minimize the possibility of shearing the line when the latter engages objects such as stones, etc. during the use of the trimmer and the interior walls of the rim portion are angled also to provide for ease of insertion of the end of the cutting line into the aperture thereon.

A preferred embodiment of the cutting line or cord has a triangular cross section thereby providing a plurality of edges which efficiently slice through grass and the like vegetation.

DESCRIPTION OF THE DRAWING

In the drawing:

FIG. 1 is a perspective view of a lawn trimmer which uses a short length of plastic or the like line as the cutting element and a rotatably driven hub member including means for attaching the cutting line thereto according to the invention;

FIG. 2 is an enlarged fragmentary perspective view of the motor housing of the trimmer of FIG. 1 illustrating the cutting line element and hub member including the line attaching means according to the invention;

FIG. 3 is an enlarged fragmentary view of the cutting line element and hub member of FIG. 2;

FIG. 4 is a fragmentary view of the cutting line element and hub member of FIG. 3 illustrating the manner in which a length of cutting line is attached to the rotating hub member of the trimmer according to the invention;

FIG. 5 is a perspective view of a length of cutting line according to the invention;

FIG. 6 is a cross sectional view of the cutting line of FIG. 5 taken along the line 6—6;

FIG. 7 is an end view of the hub member of FIG. 3 taken along the line 7—7; and

FIG. 8 is a sectional view of the hub member of FIG. 6 taken along the lines 8—8.

DETAILED DESCRIPTION OF THE DRAWING

Referring now to the drawing in greater detail wherein like numerals have been employed throughout the various views to designate similar components, there is illustrated in FIG. 1, a grass trimmer designated generally by the numeral 10. The trimmer includes a handle portion 12 to which there is connected a shaft 14 of about three feet in length. At the opposite end of the shaft there is provided a motor housing 16. In the embodiment of the trimmer depicted in FIG. 1, a high r.p.m. electric AC motor (not shown) is mounted within the housing 16. An electrical cord 18 extends through the handle 12 and shaft 14 of the trimmer into housing 16 whereat it is connected to the motor to provide electrical energy thereto. Male plug 19 at the free end of the cord 18 is adapted for connection to a suitable source of electricity. A switch (not shown) is provided in handle 12 for operating the motor. A trigger type switch actuator 20 is used to operate the switch to control the application of energy to the motor.

The free end 22 of the motor housing includes a flat wall portion 24 defining an aperture 25 (FIG. 8) through which the rotatably driven drive shaft 27 of the motor extends.

A hub member 26 to which a relatively short length of cutting line 28 is attachable, is mounted on the free end of the motor drive shaft for rotation therewith. A shroud 30 integrally formed with the housing, partially surrounds the hub member and cutting line to control the direction in which grass clippings or other objects engaged by the spinning line 28 are projected.

The hub member 26 is preferably of molded plastic construction and includes a central body portion 32 extending outwardly from an enlarged flange portion 36. An axially extending recess 38 (FIG. 8) is defined in end 37 opposite free end 34 of the member for receiving the motor drive shaft 27. The hub member is attached to the drive shaft via conventional means, such as, for example, a pin or the like fastener. An extension portion 40 at end 37 of the hub member extends through the aperture in wall portion 24 of the housing so that surface 42 of the flange portion 36 is positioned adjacent thereto. The flange portion 36 of the hub member overlies aperture 25 in wall 24 of the housing to prevent grass clippings, etc., from entering the motor housing therethrough.

A rim portion 44 extends outwardly from and partially about the periphery of the free end 34 of the hub member 26. The rim portion defines a radially extending aperture 46 therein. The outer wall surface 48 of the rim portion surrounding the aperture 46 is tapered to eliminate sharp edges which could damage the plastic cutting line.

A cylindrically shaped post 50 having a predetermined diameter length extends outwardly from end 34 of the hub member substantially parallel to the axis of rotation thereof. The post 50 is positioned predeterminedly off center (see FIG. 7) with respect to the axis of rotation in the direction opposite the rim portion 44 along an imaginary line extending radially through the aperture 46 and post 50. The purpose of offsetting the post 50 in this manner is to permit more space for the user to attach the eyelet connector, thereby making attachment and removal of the line relatively simple. The post 50 can, however, be coincident with the axis of rotation of the hub member if desired. Also, the hub member is molded to provide an inherent counterbalancing effect for proper rotation upon attachment of cutting line 28 thereto. This is accomplished by the provision of a thickened portion 51 of the hub member on the side thereof opposite the rim portion 44.

The cutting line 28 according to the invention includes a relatively short (approximately three inches) piece of mono or multi-filament nylon or the like material having a looped end 29. In the preferred embodiment, shown best in FIG. 5, looped end 29 is provided by an eyelet connector 31 crimped onto the line end. The connector defines a circular aperture 37 having a diameter slightly larger than the diameter of post 50. Thus, upon receipt of the post 50 in aperture 37 of the connector there is a minimum of play therebetween. Looped end 29 can be provided in many other ways which will be understood by one skilled in the art.

The line 28 according to the invention has a triangular cross section (see FIG. 6) to provide three edges, such as 33, for slicing through grass or the like vegetation. The slicing edges 33 on line 28 provide for more efficient cutting of grass.

The cutting line is quickly and easily attached to the hub member 26. The manner of attachment of the line is illustrated in FIG. 4 of the drawing. To attach line 28, the free end 35 thereof is inserted from the post side of rim portion 44 through aperture 46 until the aperture 37 in eyelet connector 31 is aligned with post 50. To provide for ease of insertion of the free end 35 of the line into aperture 46 in the rim portion 44, the interior walls 45, 47 of the rim portion are angled toward the aperture 46. Also a third angled wall portion or ramp 49 is formed at the free end of the hub member adjacent walls 45, 47. The angled walls 45, 47 and ramp 49 converge toward the aperture 46 to provide a guide for the free end 35 of the cutting line 28. After the line is fed through the aperture, the eyelet is placed over the post so that the latter is received in aperture 37 (see FIGS. 3 and 7). The post 50 is sufficiently long, extending outwardly beyond the point of aperture 46 in the rim portion to require that the flexible line be bent to insert post 50 in eyelet aperture 37. In this fashion, once the eyelet connector is mounted on the post 50 as shown in FIGS. 3 and 7, it cannot inadvertently become detached from the hub member.

The assembly according to the invention thus provides a simple yet effective means for easily and quickly removably attaching a short length of nylon or the like cutting line to a rotatably driven member of a grass trimmer which overcomes the drawbacks of prior art arrangements described heretofore.

While a particular embodiment of the invention has been shown and described, it should be understood that the invention is not limited thereto as many modifications thereof may be made. It is therefore contemplated to cover by the present application any and all such modifications as fall within the true spirit and scope of the appended claims.

We claim:

1. In a grass trimmer having rotatable drive means and a cutting element comprising a relatively short length of non-metallic, flexible cutting line, a connector having an aperture of a predetermined shape defined therein provided at a first end of said cutting line, an assembly for removably attaching the length of cutting line to said rotatable drive means for spinning said line, said assembly comprising: a hub member coupled to said drive means for rotation thereby, said hub member including a post extending outwardly from the free end thereof, said post being shaped complementarily to the shape of said aperture in said connector and dimensioned for receipt in said connector aperture, with limited play between said post and connector, and rim means extending outwardly from and along at least a portion of the free end of said hub member and being spaced from said post, said rim means defining an aperture extending substantially radially with respect to the axis of rotation of said hub member, the end of said length of cutting line opposite said connector being receivable in said radial aperture with the last-mentioned end extending radially outwardly from said rim means and said post being receivable in the aperture of said connector for removably attaching said length of cutting line to said hub member, the free end of said post extending outwardly from said hub member beyond the point at which the radially extending aperture in said rim means is defined to ensure that said length of cutting line remains secured to said hub member.

2. In a grass trimmer having rotatable drive means and a cutting element comprising a length of relatively flexible cutting line including loop means provided at one end thereof, spun at high speed, an assembly for removably attaching the cutting line to said rotatable drive means for spinning said line, said assembly comprising: a hub member coupled to said drive means for rotation thereby, said hub member including a post extending outwardly from the free end thereof and rim means extending outwardly from and along at least a portion of the free end of said hub member and being spaced from said post, said rim means defining an aperture extending substantially radially with respect to the axis of rotation of said hub member, the end of said length of cutting line means being receivable in said aperture with said last-mentioned end extending outwardly from said rim means and said post being receivable in said loop means for attaching said length of cutting line to said hub member, wherein said hub member includes a thickened portion on the side of said axis of rotation of said hub member opposite that of said rim means for counter-balancing said hub member upon attachment of said length of cutting line thereto.

3. In a grass trimmer having rotatable drive means and a cutting element comprising a length of relatively flexible cutting line including loop means provided at one end thereof, spun at high speed, an assembly for removably attaching the length of cutting line to said rotatable drive means for spinning said line, said assembly comprising: a hub member coupled to said drive means for rotation thereby, said hub member including a post extending outwardly from the free end thereof and rim means extending outwardly from and along at least a portion of the free end of said hub member and being spaced from said post, said rim means defining an aperture extending substantially radially with respect to the axis of rotation of said hub member, the end of said length of cutting line opposite said loop means being receivable in said aperture with said last-mentioned end extending outwardly from said rim means and said post being receivable in said loop means for attaching said length of cutting line to said hub member, wherein said post extends outwardly from said hub member substantially parallel to the axis of rotation thereof and is spaced from and on the side of said axis of rotation of said hub member opposite that of the rim means for easy attachment and removal of said end of said line including said loop means to said post.

4. In a grass trimmer having rotatable drive means and a cutting element comprising a length of relatively flexible cutting line including loop means provided at one end thereof, spun at high speed, an assembly for removably attaching the length of cutting line to said rotatable drive means for spinning said line, said assembly comprising: a hub member coupled to said drive means for rotation thereby, said hub member including a post extending outwardly from the free end thereof and rim means extending outwardly from and along at least a portion of the free end of said hub member and being spaced from said post, said rim means defining an aperture extending substantially radially with respect to the axis of rotation of said hub member, the end of said length of cutting line opposite said loop means being receivable in said aperture with said last-mentioned end extending outwardly from said rim means and said post being receivable in said loop means for attaching said length of cutting line to said hub member, wherein said hub member includes guide means provided therein for guiding said end of said cutting line into the aperture in said rim means.

5. An assembly as claimed in claim 4 wherein said guide means includes angled walls formed on said rim means and a ramp portion formed on the free end of said hub member, all of which converge toward said aperture.

6. An assembly as claimed in claim 1 wherein said hub member defines on the end thereof opposite said free end, an axially aligned recess for receiving therein said rotatable drive means and means for attaching said drive means to said hub member whereby the latter is driven rotatably thereby.

7. An assembly as claimed in claim 1 wherein said rim means includes an external wall opposite said post, the surface of which is tapered about said radially extending aperture to minimize shearing of said cutting line.

8. A trimmer for cutting grass or the like vegetation including in combination, rotatable drive means, a relatively short length of non-metallic, flexible cutting line, an eyelet connector having an aperture of a predetermined shape defined therein fixedly attached to a first end of said length of cutting line and a hub member coupled at one end to said rotatable drive means for rotation thereby including means for attaching said length of cutting line thereto, said attaching means including a post extending outwardly from the free end of said hub member substantially parallel to the axis of rotation thereof and rim means extending outwardly from and along at least a portion of the free end of said hub member and being spaced from said post, said rim means defining an aperture therein extending substantially radially with respect to the axis of rotation of said hub member, the end of the length of said cutting line opposite the first end thereof being received in said aperture with the last-mentioned end extending radially outwardly from said rim means and said post being shaped complementarily to the shape of said aperture in said connector for receipt in said connector aperture with limited play between said post and connector for removably attaching said length of line to said hub member, the free end of said post extending outwardly from said hub member beyond the point at which the radially extending aperture in said rim means is defined to ensure that said length of cutting line remains secured to said hub member.

9. A trimmer for cutting grass or the like vegetation including in combination, rotatable drive means, a length of relatively flexible cutting line having loop means provided at a first end thereof and a hub member coupled at one end to said rotatable drive means for rotation thereby including means for attaching said cutting line thereto, said attaching means including a post extending outwardly from the free end of said hub member substantially parallel to the axis of rotation thereof and rim means extending outwardly from and along at least a portion of the free end of said hub member and being spaced from said post, said rim means defining an aperture therein extending substantially radially with respect to the axis of rotation of said hub member, the end of said cutting line opposite the end thereof including said loop means being received in said aperture with the last-mentioned end extending outwardly from said rim means and said post being received in said loop means for removably attaching said line to said hub member, wherein said loop means includes an eyelet connector having an aperture of a predetermined shape defined therein, said connector being affixed to one end of said cutting line, and wherein said post is shaped complementarily to the shape of said aperture in said connector but dimensionally slightly smaller than said aperture, whereby upon receipt of said post in said aperture there is a relatively small amount of play between said connector and said post.

10. A trimmer as claimed in claim 9 wherein said aperture defined in said eyelet connector is circular in shape with a diameter of a predetermined size and wherein said post has a circular cross section with a diameter slightly smaller than the diameter of the aperture of said eyelet connector.

11. A trimmer as claimed in claim 8 wherein said length of cutting line has a polygonal cross section thereby to provide a plurality of cutting edges extending the length thereof.

12. A trimmer as claimed in claim 11 wherein said length of cutting line has a triangular cross section.

13. A new and improved grass trimmer including in combination:
   a cutting element comprising a short length of flexible, non-metallic line having a loop of a predetermined dimension provided at one end thereof;
   a rotatably driven member including means for attaching said cutting element thereto, whereby said element is spun at high speed, said attaching means including a post extending outwardly from the free end of said member; and said post being complementarily shaped to the shape of said loop and dimensioned for receipt therein with limited play therebetween;
   rim means extending outwardly from said free end of said member and spaced from said post, said rim means defining an aperture of a predetermined dimension extending substantially radially with respect to the axis of rotation of said member, the end of said cutting line opposite said loop being dimensioned for receipt in said radial aperture and extending through said aperture radially outwardly from said rim means and said loop receiving said post for removably attaching said line to said member, the free end of said post extending outwardly from said hub member beyond the point at which the radially extending aperture in said rim is defined to ensure that said cutting line remains attached to said hub member.

14. A new and improved grass trimmer including in combination:
   a cutting element comprising a short length of relatively flexible line having loop means provided at one end thereof; and
   a rotatably driven member including means for attaching said cutting element thereto, whereby said element is spun at high speed, said attaching means including a post extending outwardly from the free end of said member; and
   rim means extending outwardly from said free end of said member and spaced from said post, said rim means defining an aperture extending substantially radially with respect to the axis of rotation of said member, the end of said cutting line opposite said loop means extending through said aperture radially outwardly from said rim means and said loop means receiving said post for removably attaching said line to said member, wherein said hub member includes a thickened portion on the side of the axis of rotation opposite said rim for counterbalancing said member upon attachment of said cutting line.

15. A new and improved grass trimmer including in combination:
   a cutting element comprising a short length of relatively flexible line having loop means provided at one end thereof; and
   a rotatably driven member including means for attaching said cutting element thereto, whereby said element is spun at high speed, said attaching means including a post extending outwardly from the free end of said member; and
   rim means extending outwardly from said free end of said member and spaced from said post, said rim means defining an aperture extending substantially radially with respect to the axis of rotation of said member, the end of said cutting line opposite said loop means extending through said aperture radially outwardly from said rim means and said loop means receiving said post for removably attaching said line to said member, wherein said rotatably driven member includes guide means for guiding said end of said cutting line opposite said loop means into the aperture in said rim means, said guide means including angled walls formed on said rim means adjacent said aperture and a portion formed on said member, all of which converge toward said aperture in said rim means.

16. A new and improved grass trimmer including in combination:
   a cutting element comprising a short length of relatively flexible line having loop means provided at one end thereof; and
   a rotatably driven member including means for attaching said cutting element thereto, whereby said element is spun at high speed, said attaching means including a post extending outwardly from the free end of said member; and
   rim means extending outwardly from said free end of said member and spaced from said post, said rim means defining an aperture extending substantially radially with respect to the axis of rotation of said member, the end of said cutting line opposite said loop means receiving said post for removably attaching said line to said member, wherein said post has a circular cross section of a predetermined diameter and wherein said loop means includes an eyelet connector attached to said one end of said cutting line, said connector defining a circular aperture having a diameter slightly larger than the diameter of said post for receipt of the latter thereon whereby there is only a small amount of play between said connector and said post.

17. A grass trimmer as claimed in claim 16 wherein said rim means extends about a portion of the periphery of said member and wherein the free end of said post extends outwardly beyond the point at which the radially extending aperture in said rim means is defined, whereby the cutting line must be bent to insert said post into the aperture defined by said connector.

18. A grass trimmer as claimed in claim 16 wherein said cutting line has a triangular cross section thereby to provide three grass cutting edges extending the length thereof.

19. A grass trimmer as claimed in claim 16 further including a housing having motor means mounted thereon said motor means including rotatable drive shaft means, said housing having a wall portion, defining an aperture through which said drive shaft means extends and wherein said rotatably driven member is coupled to said drive shaft means at one end thereof for rotation therewith, said hub member including a flange portion formed at said one end and positioned in spaced relation with respect to said wall portion outside of said housing, said flange portion being sufficiently large to cover said aperture thereby to prevent grass and the like from entering said housing through said aperture.

20. A grass trimmer as claimed in claim 19 wherein said rotatably driven member is of a molded plastic construction with said post, said rim means and said flange portion being formed integrally therewith.

21. A trimmer for cutting grass or the like vegetation including in combination a rotatable drive means and a cutting element comprising a relatively short length of non-metallic, flexible cutting line of a predetermined cross sectional dimension having first securing means provided at one end thereof, and an assembly for removably attaching said length of cutting line to said rotatable drive means for spinning said cutting line, said assembly including a hub member coupled to said drive means for rotation thereby, said hub member including second securing means provided at the free end thereof and rim means extending outwardly from and along at least a portion of the free end of said hub member and being spaced from said second securing means, said rim means defining an aperture having a width only slightly larger than the cross sectional dimension of said line extending substantially radially with respect to the axis of rotation of said hub member, the end of said length of cutting line opposite said first securing means being receivable in said aperture with said last-mentioned end extending therethrough radially outwardly from said rim means a predetermined distance, the sidewise movement of said cutting line within said radial aperture being restricted because of the dimensional relation between the cross sectional dimension of said cutting line and the width of said radial aperture and said first and second securing means being engageable for removably attaching said length of cutting line to said hub member.

22. A trimmer as claimed in claim 21 wherein said first securing means comprises one of a loop and a post member formed at said one end of said length of line, wherein said second securing means comprises the other of said loop and post member formed at the free end of said hub member, in spaced relation to said rim means, and wherein said post member is receivable in said loop for removably attaching said length of cutting line to said hub member.

23. A trimmer as claimed in claim 22 wherein said post member is located on said hub member generally at the axis of rotation thereof and said loop is formed at said one end of said cutting line.

24. A trimmer as claimed in claim 23 wherein said loop comprises an eyelet connector coupled to said one end of said length of line, said eyelet connector having an aperture of dimension and shape complementary to that of said post member for receipt of said post member therein, thereby to removably attach said line to said hub member.

25. A trimmer for cutting grass or the like vegetation including in combination, rotatable drive means and a relatively short non-metallic, flexible cutting line element having first positive securing means provided thereon and an assembly for removably attaching said length of cutting line element to said rotatable drive means for spinning said cutting line element, said assembly including a hub member coupled to said drive means for rotation thereby, said hub member including second positive securing means provided on the free end thereof, said first and second positive securing means being engageable to positively retain said cutting line element on said hub member so that said element extends generally radially outwardly therefrom during or in the basence of rotation of said hub member, whereby a positive force is required to disengage said cutting line element from said hub member, said hub member further including rim means spaced from said second positive securing means, having a passage formed therein through which the end of said cutting line element opposite said first securing means passes radially outwardly from said hub member, said passage having a cross sectional dimension only slightly larger than that of said cutting line element to restrict the sidewise movement thereof.

26. A trimmer as claimed in claim 25 wherein said first positive securing means includes connector means attached to said cutting line element and wherein said second positive securing means includes means for receiving said connector for positive engagement therewith.

27. A trimmer as claimed in claim 25 wherein said hub member is generally cylindrical in construction and includes means thereon for counterbalancing said cutting line element.

28. A trimmer as claimed in claim 27 wherein said counterbalancing means includes an enlarged portion of said hub member on the side thereof opposite said cutting line element.

* * * * *